United States Patent

Iguchi

[11] Patent Number: 5,815,781
[45] Date of Patent: Sep. 29, 1998

[54] DEVELOPMENT DEVICE

[75] Inventor: Yoshiyuki Iguchi, Takarazuka, Japan

[73] Assignee: Minolta Co., Ltd., Osaka, Japan

[21] Appl. No.: 877,818

[22] Filed: Jun. 18, 1997

[30] Foreign Application Priority Data

Jun. 21, 1996 [JP] Japan .................................. 8-181254

[51] Int. Cl.⁶ .................................................. G03G 15/09
[52] U.S. Cl. .......................................... 399/274; 399/272
[58] Field of Search .................................... 399/272, 274; 118/261

[56] References Cited

U.S. PATENT DOCUMENTS

| | | | |
|---|---|---|---|
| 5,438,395 | 8/1995 | Koga et al. | 399/284 |
| 5,570,168 | 10/1996 | Koga et al. | 399/272 |
| 5,581,336 | 12/1996 | Matsuzaki et al. | 399/270 |
| 5,621,505 | 4/1997 | Kobayashi et al. | 399/274 |
| 5,708,941 | 1/1998 | Koga et al. | 399/272 |

FOREIGN PATENT DOCUMENTS 59-121076 7/1984 Japan .
4-86875 3/1992 Japan .

*Primary Examiner*—Matthew S. Smith
*Attorney, Agent, or Firm*—Burns, Doane, Swecker & Mathis, LLP

[57] ABSTRACT

A development device of this invention includes a developer carrier for transporting a developer to a development region opposite to an image bearing body as binding the developer thereto by means of a magnetic force, and a regulating member opposing the developer carrier across a required distance therebetween and regulating the amount of developer transported by the developer carrier to the development region, the regulating member having a greater roughness at its surface opposite to the developer carrier than the developer carrier.

13 Claims, 3 Drawing Sheets

DEVELOPMENT DEVICE

BACKGROUND OF THE INVENTION

1. Field of the Invention

The present invention relates generally to a development device for use in image forming apparatuses, such as copying machines, printers and the like, which is adapted to develop an electrostatic latent image formed on an image bearing body and more particularly, to a development device comprising a developer carrier for transporting a developer to a development region opposite to the image bearing body as binding the developer thereto by means of a magnetic force, and a regulating member for regulating the amount of developer carried on the developer carrier to the development region, the regulating member opposing the developer carrier across a required distance therebetween.

2. Description of the Related Art

Various types of development devices have conventionally been used in the image forming apparatuses, such as copiers, printers and the like, for developing an electrostatic latent image formed on the image bearing body.

As shown in FIG. 1, an example of such development devices comprises a cylindrical developer sleeve 11 (developer carrier) opposing an image bearing body 1 and including a magnet member 12 with a plurality of magnetic poles, N, S, . . . , on the inner periphery thereof. The developer sleeve 11 is adapted to rotate to carry the developer toward an image bearing body 1 as binding the developer thereto by means of a magnetic force of the magnet member 12, while a regulating member 13 opposing the developer sleeve 11 across a required distance Db therebetween serves to regulate the amount of developer thus carried on the developer sleeve 11 thereby allowing the developer sleeve 11 to transport a regulated amount of developer to a development region opposite to the image bearing body 1 for development of an electrostatic latent image formed on the image bearing body 1.

The aforesaid development device known to the art is arranged such that a somewhat great distance Db is defined between the developer sleeve 11 and the regulating member 13 so that the developer in the form of a magnetic brush is introduced into the development region opposite to the image bearing body 1, coming into contact with the image bearing body 1 for development of the electrostatic latent image formed thereon.

Unfortunately, however, in the development process performed by bringing the magnetic brush into contact with the image bearing body 1, the magnetic brush may scrape off a toner supplied to the image bearing body 1, thus producing a streak-like noise or disturbance in a resultant image.

Hence, a recent study has been made on an arrangement wherein a decreased distance Db is defined between the developer sleeve 11 and the regulating member 13 for reduction in the amount of developer carried on the developer sleeve 11 to the development region where the electrostatic latent image is developed with the developer kept from contact with the image bearing body 1.

Unfortunately, a problem exists with the decreased distance Db between the developer sleeve 11 and the regulating member 13. More specifically, there may occur variations of the amount of developer transported by the developer sleeve 11 to the development region or a gap between the developer sleeve 11 and the regulating member 13 may become clogged with a foreign matter having entered the development device or an agglomerate of the developer and the like formed within the development device, the clogged gap hindering the developer sleeve 11 from carrying the developer thereon. This results in the production of a white area, such as a white streak, in the resultant image.

As a solution to this problem, there has been offered a development device wherein the regulating member 13 is formed of a magnetic material so as to magnetically bind the developer thereto, thus allowing the developer sleeve 11 to transport a constant, small amount of developer to the development region opposite to the image bearing body 1 despite a great distance Db defined between the developer sleeve 11 and the regulating member 13.

Recently, however, the developer sleeve 11 is required to transport a further decreased amount of developer to the development region for production of high-definition images with an enhanced development efficiency.

Hence, even the development device with the regulating member formed of the magnetic material must define a reduced distance Db between the developer sleeve 11 and the regulating member 13. Therefore, there still exists the aforementioned problem that varied amounts of developer are transported by the developer sleeve 11 to the development region or the gap between the developer sleeve 11 and the regulating member 13 becomes clogged with the foreign matter having entered the device or the agglomerate of the developer and the like formed within the device. The clogged gap hinders the developer sleeve 11 from carrying thereon the developer, resulting in the production of a white area, such as a white streak, in the resultant image.

SUMMARY OF THE INVENTION

It is therefore, an object of the invention to provide a development device wherein the regulating member, as magnetically binding the developer thereto, regulates the amount of developer transported by the developer carrier to the development region opposite to the image bearing body and the developer carrier is allowed to transport a small amount of developer to the development region despite an increased distance defined between the developer carrier and the regulating member in opposed relation.

It is another object of the invention to provide a development device adapted for prevention of the variations in the amount of developer transported to the development region by means of the developer carrier adapted to carry thereon a reduced amount of developer.

It is still another object of the invention to provide a development device adapted to prevent the gap between the regulating member and the developer carrier from becoming clogged with a foreign matter having entered the development device or an agglomerate of the developer and the like formed within the device, thereby avoiding the production of a white area, such as a white streak, in the resultant image.

It is yet another object of the invention to provide a development device allowing the developer carrier to transport a constant, small amount of developer to the development region for a reliable production of favorable, high-definition images.

The development device according to the invention comprises a developer carrier for transporting a developer to the development region opposite to an image bearing body while binding the developer thereto by means of a magnetic force, and a regulating member opposing the developer carrier across a required distance therebetween and regulating the amount of developer transported by the developer carrier to the development region, the regulating member having a greater roughness at its surface opposite to the developer carrier than the developer carrier.

In the development device of this invention, a frictional force is produced between the developer and the developer-carrier-opposed surface of the regulating member when the developer, as magnetically bound to the developer carrier, is carried through a gap between the regulating member and the developer carrier in opposed relation.

With the arrangement of the invention wherein the regulating member has a greater surface roughness at its developer-carrier-opposed surface than that of the developer carrier in opposed relation, an increased frictional force is produced between the carrier-opposed surface of the regulating member and the developer, thus hindering the developer from being passed through the gap between the regulating member and the developer carrier. This provides for a reliable transportation of a constant, small amount of developer to the development region despite a great distance defined between the regulating member and the developer carrier.

Additionally, such a great distance defined between the regulating member and the developer carrier is effective to prevent the gap between the developer carrier and the regulating member from becoming clogged with the foreign matter and the like and hence, a reliable production of favorable images free from a white area, such as a white streak, is assured.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Figure 1:
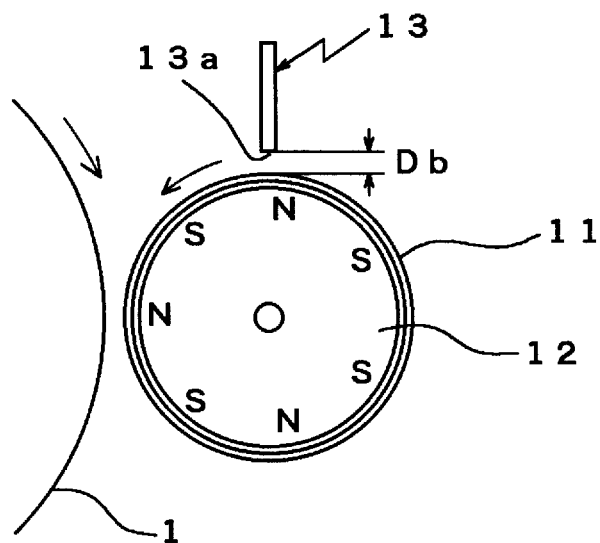
FIG. 1 is a partial diagrammatic view for illustrating a development device wherein a regulating member regulates the amount of developer carried on a developer sleeve while the developer is transported by the developer sleeve to a development region opposite to an image bearing body.

Now, description will hereinbelow be given on preferred embodiments of the development device according to the invention.

According to an aspect of the development device of the invention, in order that the regulating member serves to regulate the amount of developer transported by the developer carrier to the development region in the aforementioned manner, the regulating member has a greater surface roughness at its developer-carrier-opposed surface than the developer carrier and is formed of a magnetic material. With this construction, when carried through the gap defined between the regulating member and the developer carrier in opposed relation, the developer is not only regulated by the frictional force produced between the developer and the carrier-opposed surface of the regulating member but is also magnetically bound to the regulating member.

This provides for a proper regulation of the amount of developer carried on the developer carrier to the development region despite an increased distance defined between the developer carrier and the regulating member. Thus are reduced the variations of the amount of developer transported to the development region while the gap between the developer carrier and the regulating member is prevented from becoming clogged with a foreign matter and the like having entered the development device. As a result, a reliable production of favorable images free from a white area, such as a white streak, is assured.

Incidentally, the roughness may be imparted to the carrier-opposed surface of the regulating member by means of cutting or the like.

According to another aspect of the development device of the invention, in order that the aforesaid regulating member regulates the amount of developer carried on the developer carrier for transportation of a constant, small amount of developer, the developer carrier preferably has a 10-point average roughness Rs of not greater than 30 $\mu$m at its surface and the relationship between the 10-point average roughness Rs of the surface of the developer carrier and that Rb of the carrier-opposed surface of the regulating member preferably satisfies $1.1 \leq Rb/Rs \leq 5.0$.

Further, in order that the carrier-opposed surface of the regulating member exerts a sufficient frictional force on the developer thereby regulating the amount of developer carried through the gap between the regulating member and the developer carrier as a part of the aforementioned regulation of the amount of developer carried on the developer carrier, the carrier-opposed surface of the regulating member preferably has a thickness of not smaller than 0.5 mm with respect to the moving direction of the developer.

According to a still another aspect of the development device of the invention, in order to allow the regulating member to positively regulate the amount of developer passed through the gap between the regulating member and the developer carrier when a developer comprising a carrier and a toner is used, the carrier preferably has an average particle size of 20 to 70 $\mu$m.

Next, the development device according to a preferred embodiment of the invention will be described in detail with reference to the accompanying drawings.

Similarly to the prior-art development device shown in FIG. 1, the development device of this embodiment comprises a cylindrical developer sleeve 11 (developer carrier) opposing an image bearing body 1 and including a magnet member 12 with a plurality of magnetic poles, N, S, . . . , on the inner periphery thereof. The developer sleeve 11 is adapted to rotate for transportation of a developer 2 toward the image bearing body 1 as binding the developer thereto by means of a magnetic force of the magnet member 12.

On the other hand, a regulating member 13 opposing the developer sleeve 11 across a required distance Db therebetween serves to regulate the amount of developer 2 thus carried on the developer sleeve 11 so that the image bearing body 1 may be supplied with a regulated amount of developer. Thus, a proper amount of developer is transported by the developer sleeve 11 to a development region opposite to the image bearing body 1 for development of an electrostatic latent image formed on the image bearing body 1.

Figure 2:
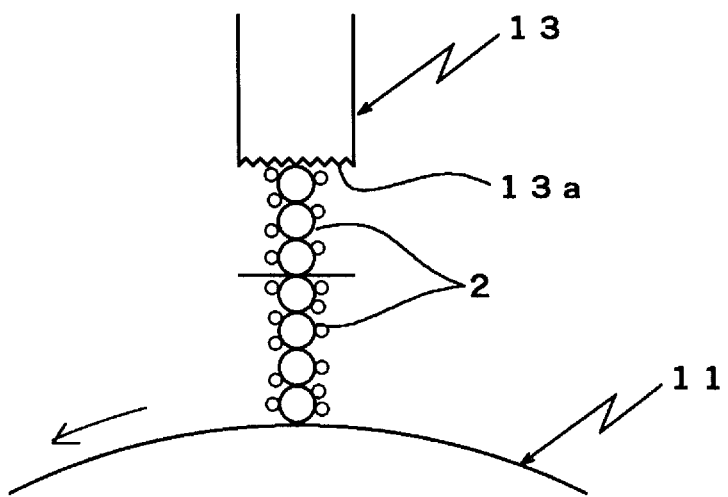
FIG. 2 is a partial diagrammatic view for illustrating a state wherein the developer carried on the developer sleeve is regulated by the regulating member.

In the development device of this embodiment, the aforesaid regulating member 13 is formed of a magnetic material and has its surface 13a opposite to the developer sleeve 11 finished by cutting so as to be imparted with a greater surface roughness than that of the developer sleeve 11, as shown in FIG. 2.

With this construction, the developer 2 carried through a gap between the developer sleeve 11 and the regulating member 13 is magnetically bound to the regulating member 13 while an increased frictional force is produced between the sleeve-opposed surface 13a of the regulating member 13 and the developer 2, hindering the developer 2 from being carried through the gap between the regulating member 13 and the developer sleeve 11. This provides for a reliable transportation of a constant, small amount of developer 2 to the development region in opposite relation to the image bearing body 1 despite an increased distance Db defined between the regulating member 13 and the developer sleeve 11.

Next, advantages of the development device according to the invention will be clarified by way of various examples thereof.

(EXAMPLES 1 to 3)

In these examples, a developer comprising a mixture of a carrier with an average particle size of 30 $\mu$m and a toner with an average particle size of 8 $\mu$m and having a toner concentration of 15 wt % was used in the development device of the above construction. A developer sleeve 11 used therein had an outside diameter of 24.5 mm and a 10-point average roughness Rs of 10.0 $\mu$m at its surface, which was subject to a sandblasted finish.

On the other hand, there were used three types of regulating members 13, each of which was formed of a magnetic material of SUS430 and had a thickness t of 1.5 mm with respect to the moving direction of the developer. The regulating members of Examples 1 to 3 had 10-point average roughnesses Rb of 2.0 $\mu$m, 10.0 $\mu$m, and 15.0 $\mu$m at the sleeve-opposed surfaces 13a thereof, respectively. The relationships between the 10-point average roughness Rs of the surface of the developer sleeve 11 and the 10-point roughnesses Rb of the sleeve-opposed surfaces 13a of the regulating members 13 of Examples 1 to 3, or Rb/Rs values were at 0.2, 1.0 and 1.5, respectively.

Figure 3:
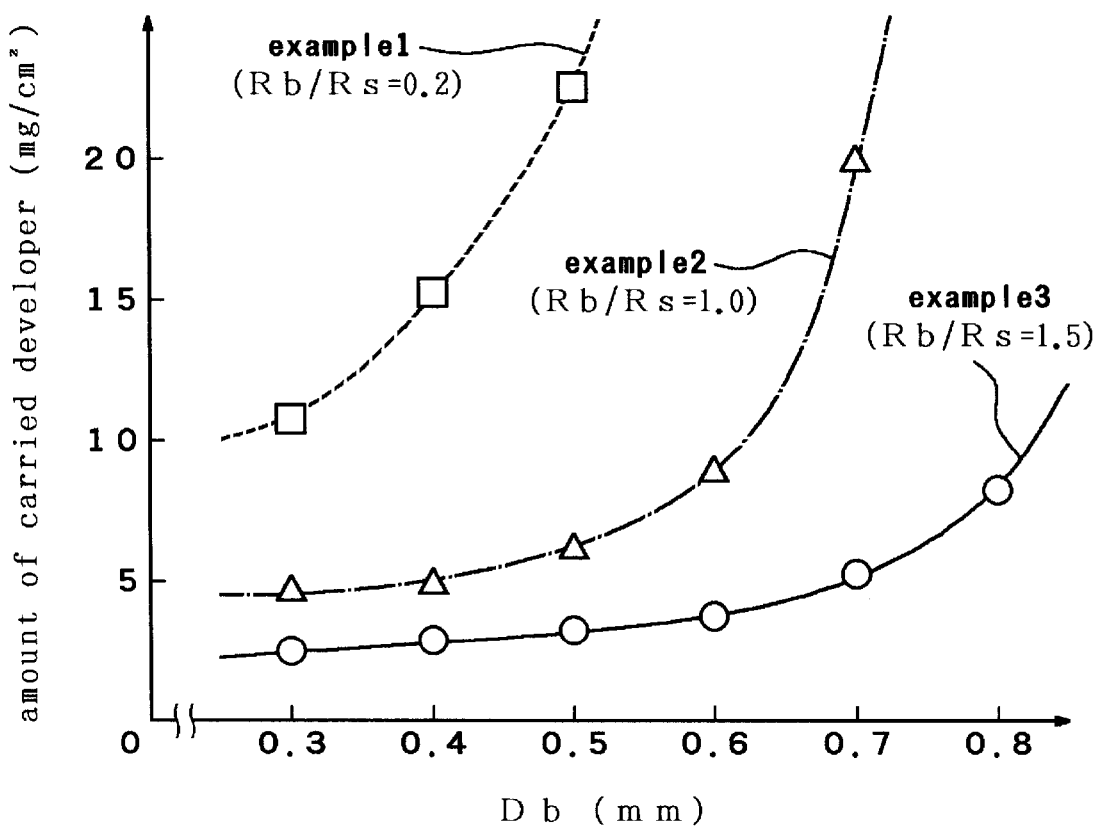
FIG. 3 is a graphical representation of Examples 1 to 3 for illustrating individual relationships between the distance Db from the regulating member to the developer sleeve and the amount of developer transported to the development region by means of the developer sleeve.

The aforesaid developer sleeve 11 was rotated at a speed of 265 mm/sec while the amount of developer carried on the developer sleeve 11 was regulated by each regulating member 13. Measurement was taken on the amount of developer carried past each regulating member 13 by means of the developer sleeve 11, with the distance Db varied between each regulating member 13 and the developer sleeve 11. The results are shown in FIG. 3.

As apparent from the results, in the development device of Example 3 wherein the sleeve-opposed surface 13a of the regulating member has a greater 10-point average roughness Rb than that Rs of the surface of the developer sleeve 11 and the Rb/Rs value is 1.5, smaller amounts of developer are transported than in the development devices of Example 1 with the Rb/Rs value of 0.2 and of Example 2 with the Rb/Rs value of 1.0 even when the distance Db between the developer sleeve 11 and the regulating member 13 is increased. Additionally, the device of Example 1 presents reduced changes in the amount of developer carried past the regulating member 13 despite the varied distances Db defined between the developer sleeve 11 and the regulating member 13, thus achieving a stable transportation of small amounts of developer to the development region by means of the developer sleeve 11.

(EXAMPLES 4 to 6)

In these examples, the same developer as in the aforementioned examples was used whereas the regulating member 13 was formed of the magnetic material of SUS430 and had a thickness t of 1.5 mm with respect to the moving direction of the developer. The sleeve-opposed surface 13a of the regulating member 13 had a 10-point average roughness Rb of 10.0 $\mu$m.

On the other hand, there were used three types of developer sleeves 11, each of which had an outside diameter of 24.5 mm. The developer sleeves of Examples 4 to 6 had 10-point average roughnesses Rs of 30.0 $\mu$m, 10.0 $\mu$m and 2.0 $\mu$m at the surfaces thereof, respectively. The relationships between the 10-point average roughnesses Rs of the surfaces of the developer sleeves 11 and that Rb of the sleeve-opposed surface 13a of the regulating member 13, or the Rb/Rs values were at 0.3 in Example 4, at 1.0 in Example 5 and at 5.0 in Example 6.

Figure 4:
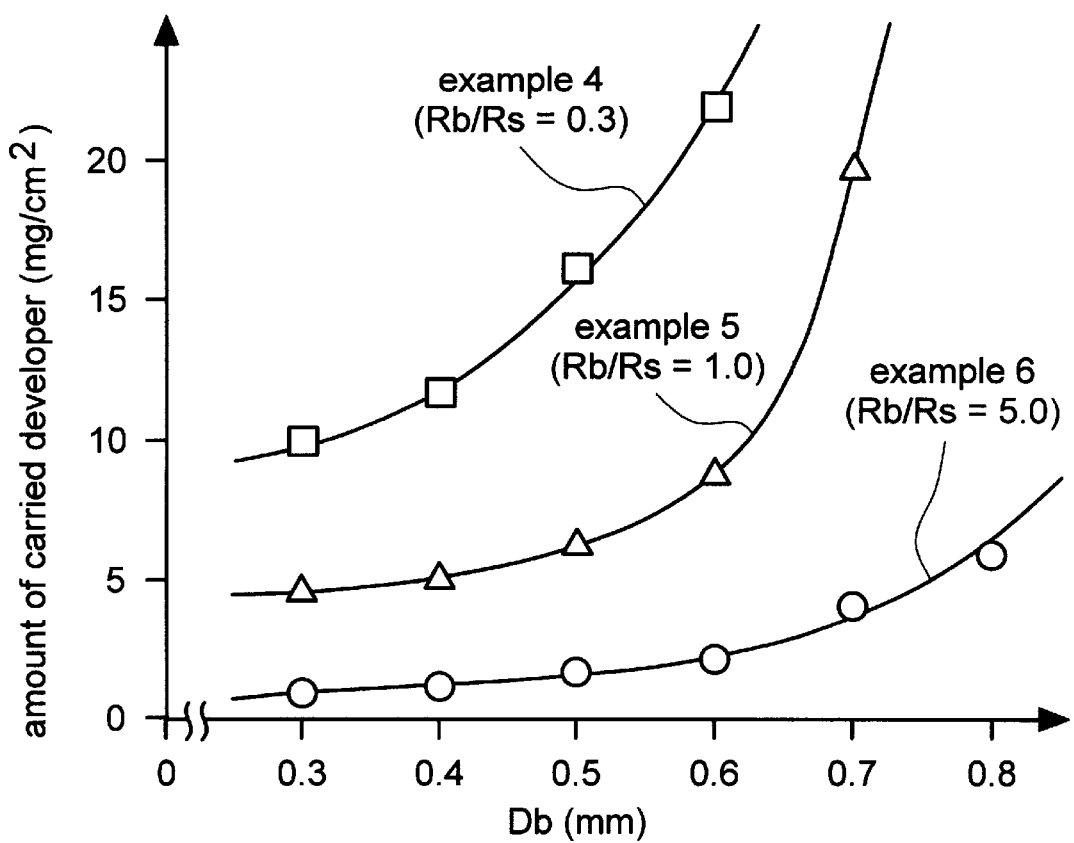
FIG. 4 is a graphical representation of Examples 4 to 6 for illustrating individual relationships between the distance Db from the regulating member to the developer sleeve and the amount of developer transported to the development region by means of the developer sleeve.

Each of the aforesaid developer sleeves 11 was rotated at a speed of 265 mm/sec while the amount of developer carried on each developer sleeve 11 was regulated by the aforesaid regulating member 13. Measurement was taken on the amount of developer carried past the regulating member 13 by means of the developer sleeve 11, with the distance Db varied between each developer sleeve 11 and the regulating member 13. The results are shown in FIG. 4.

As apparent from the results, in the development device of Example 6 wherein the sleeve-opposed surface 13a of the regulating member 13 has a greater 10-point average roughness Rb than that Rs of the surface of the developer sleeve 11 and the Rb/Rs value is 0.2, smaller amounts of developer are transported than in the devices of Example 4 with the Rb/Rs value of 0.2 and of Example 5 with the Rb/Rs value of 1.0 even when the distance Db between the developer sleeve 11 and the regulating member 13 is increased. Additionally, the device of Example 6 presents reduced changes in the amount of developer carried past the regulating member 13 despite the varied distances Db defined between the developer sleeve 11 and the regulating member 13, thus achieving a stable transportation of small amounts of developer to the development region by means of the developer sleeve 11.

(EXAMPLES 7 to 12)

In these examples, the same developer as in the aforementioned examples was used in the above development device. Developer sleeves 11 used therein had an outside diameter of 24.5 mm and a 10-point average roughness Rs of 2 $\mu$m, 6 $\mu$m, 10 $\mu$m or 30 $\mu$m at their surfaces. On the other hand, regulating members 13 were each formed of the magnetic material of SUS430 and had a thickness t of 1.5 mm with respect to the moving direction of the developer. The sleeve-opposed surface 13a of each regulating member 13 had a 10-point average roughness Rb of 2 $\mu$m, 10 $\mu$m or 15 $\mu$m.

Each of the aforementioned developer sleeves 11 and each of the regulating members 13 were used in combination as shown in the following Table 1. The Rb/Rs values of the respective examples are also shown in the table.

Each of the developer sleeves 11 was rotated at a speed of 265 mm/sec while the distance Db between the developer sleeve 11 and the regulating member 13 was adjusted so as to allow the regulating member 13 to regulate the amount of developer carried past the regulating member 13 to 5.0 mg/cm², the developer being carried on the developer sleeve 11. There were examined variations of the amount of developer carried past the regulating member 13 by means of each developer sleeve 11. The results are shown in Table 1.

Figure 5:
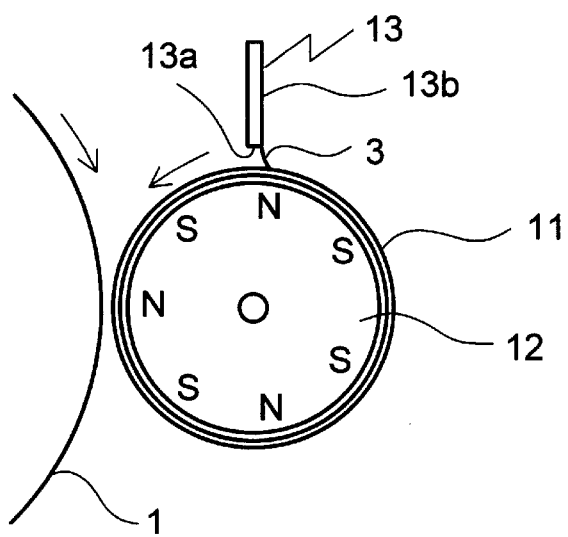
FIG. 5 is a diagrammatic view for illustrating Examples 7 to 12 wherein a piece of Mylar is attached to the regulating member in contact relation with the developer sleeve.

As shown in FIG. 5, a piece of Mylar 3, which is 2 mm in width and 0.18 mm in thickness, was attached to each regulating member 13 at its upstream-side surface 13b with respect to the moving direction of the developer in contact relation with the developer sleeve 11, thereby intentionally creating a state wherein a clogging is caused by the foreign matter. Then, the occurrence of white streaks on the surface of each developer sleeve 11 was examined. The results are shown in Table 1.

As to the varied transportation of the developer, the state of the developer on the surface of each developer sleeve 11 was visually inspected and rated on ○-to-X scale. That is, a heavily varied transportation of developer resulting in an image with heavy noise was given "X"; a varied transportation of the developer resulting in an image with recognizable noise was given "Δ"; and a constant transportation of the developer achieving a noiseless image was given "○".

TABLE 1

| Example | Rs (μm) | Rb (μm) | Rb/Rs | Db (mm) | V.T. | W.S. |
|---|---|---|---|---|---|---|
| 7 | 10 | 10 | 1.0 | 0.4 | Δ | X |
| 8 | 10 | 2 | 0.2 | ≦0.1 | X | X |
| 9 | 10 | 15 | 1.5 | 0.7 | ○ | ○ |
| 10 | 6 | 10 | 1.7 | 0.6 | ○ | ○ |
| 11 | 30 | 10 | 0.3 | ≦0.1 | X | X |
| 12 | 2 | 10 | 5.0 | 0.8 | ○ | ○ |

Note: In the table, "V.T." denotes "varied transportation of the developer" and "W.S." denotes "white streak".

As apparent from the results, in Examples 9, 10 and 12 wherein the sleeve-opposed surfaces 13a of the regulating members 13 have greater roughnesses than the surfaces of the developer sleeves 11, increased distances Db may be defined between the developer sleeves 11 and the regulating members 13 to allow the regulating members 13 to regulate the amount of developer on the developer sleeves 11 to 5.0 mg/cm². In addition, the variations of the amount of developer carried on the developer sleeves 11 are prevented. Furthermore, these developer sleeves do not suffer the occurrence of white streaks thereon when the clogging is intentionally caused by the foreign matter and thus, a stable production of favorable images is assured.

(EXAMPLES 13 to 18)

In these examples, too, the same developer as in the aforementioned examples was used in the above development device. A developer sleeve 11 used therein had an outside diameter of 24.5 mm and a 10-point average roughness Rs of 15 μm at the surface thereof. On the other hand, regulating members 13 used therein were each formed of the magnetic material of SUS430 and had a 10-point average roughnesses Rb of 10 μm or 15 μm at their sleeve-opposed surfaces 13a. The Rb/Rs value was set at 1.0 or 1.5. Each regulating member 13 had a thickness t with respect to the moving direction of the developer as shown in the following Table 2.

Then, the developer sleeve 11 was rotate d at a speed of 265 mm/sec while the distance Db between the developer sleeve 11 and each regulating member 13 was adjusted so as to allow the regulating member 13 to regulate the amount of developer carried past the regulating member 13 to 5.0 mg/cm², the developer being carried on the developer sleeve 11. Similarly to Examples 7 to 12, there were examined variations of the amount of developer carried past the regulating member 13 by means of the developer sleeve 11. The results are shown in Table 2.

TABLE 2

| Example | Rb/Rs | t (mm) | Db (mm) | V.T. |
|---|---|---|---|---|
| 13 | 1.5 | 0.5 | 0.4 | ○–Δ |
| 14 | 1.5 | 1.0 | 0.6 | ○ |
| 15 | 1.5 | 1.5 | 0.7 | ○ |
| 16 | 1.5 | 2.0 | 0.75 | ○ |
| 17 | 1.5 | 2.5 | 1.0 | ○ |
| 18 | 1.0 | 0.5 | 0.25 | X |

As apparent from the results, in Examples 13 to 17 wherein the sleeve-opposed surfaces 13a of the regulating members 13 have greater roughnesses than the surface of the developer sleeve 11, increased distances Db may be defined between the developer sleeve 11 and the regulating members 13 to allow the regulating members 13 to regulate the amount of developer on the developer sleeve 11 to 5.0 mg/cm². In addition, the variations of the amount of developer carried on the developer sleeve 11 are reduced. Particularly, the increased thickness t of the regulating member 13 with respect to the moving direction of the developer allows for further increase in the distance Db between the developer sleeve 11 and the regulating member 13 whereby the developer sleeve 11 can transport a small amount of developer to the development region in a stable manner.

(EXAMPLES 19 to 23)

In these examples, used in the aforementioned development device was a developer sleeve 11 having an outside diameter of 24.5 mm and a 10-point average roughness Rs of 10 μm at the surface thereof. On the other hand, a regulating member 13 was formed of the magnetic material of SUS430, and had a thickness t of 1.5 mm with respect to the moving direction of the developer and a 10-point average roughness Rb of 15 μm at its sleeve-opposed surface 13b. The Rb/Rs value was at 1.5.

Five types of carriers with average particle sizes (P.S.) of 15 μm, 20 μm, 40 μm, 50 μm and 70 μm were blended with toner particles with an average particle size of 8 μm, respectively, and thus were prepared developers having a toner concentration of 15 wt%.

In each example, the aforementioned developer sleeve 11 was rotated at a speed of 265 mm/sec while the distance Db between the developer sleeve 11 and the regulating member 13 was adjusted so as to allow the regulating member 13 to regulate the amount of developer carried past the regulating member to 5.0 mg/cm², the developer being carried on the developer sleeve 11. Similarly to Examples 7 to 12, there were examined variations (V.T.) of the amount of developer carried past the regulating member 13 by means of the developer sleeve 11. The results are shown the following Table 3.

TABLE 3

| Example | Rb/Rs | Carrier P.S. ($\mu$m) | Db (mm) | V.T. |
|---------|-------|-----------------------|---------|------|
| 19 | 1.5 | 15 | 0.3 | X–Δ |
| 20 | 1.5 | 20 | 0.5 | ○ |
| 21 | 1.5 | 40 | 0.7 | ○ |
| 22 | 1.5 | 50 | 0.7 | ○ |
| 23 | 1.5 | 70 | 0.8 | ○ |

As apparent from the results, the greater particle size of the carrier used in the developer allows for the corresponding increase in the distance Db between the regulating member 13 and the developer sleeve 11 whereby a stable transportation of a small amount of developer is assured. The developer including the carrier not smaller that 20 $\mu$m in particle size, in particular, do not result in the variations of the mount of developer transported.

Although the present invention has been fully described by way of example, it is to be noted that various changes and modification will be apparent to those skilled in the art.

Therefore, unless otherwise such changes and modifications depart from the scope of the present invention, they should be construed as being included therein.

What is claimed is:

1. A development device comprising:

a developer carrier member for transporting a developer to a development region opposite to an image bearing body by binding the developer to the developer carrier member by means of a magnetic force, said developer comprising a toner and a carrier, and a regulating member opposing the developer carrier member across a required distance therebetween and regulating the amount of developer transported by the developer carrier member to the development region, said regulating member being formed of a magnetic material and having a greater roughness at a surface opposite to the developer carrier member than the developer carrier member.

2. A development device of claim 1, wherein said surface of said regulating member is a cut surface.

3. A development device of claim 1, wherein said developer carrier member has a surface roughness Rs of not greater than 30 $\mu$m, and a relationship between the surface roughness Rs of the developer carrier member and a surface roughness Rb of said surface of the regulating member satisfies $1.1 \leq Rb/Rs \leq 5.0$.

4. A development device of claim 1, wherein said regulating member has a thickness of not smaller than 0.5 mm at an end portion of said regulating member having said surface.

5. A development device of claim 1, wherein said carrier has an average particle size ranging from 20 to 70 $\mu$m.

6. A development device comprising:

a developer carrier member for transporting a developer to a development region opposite to an image bearing body by binding the developer to the developer carrier member by means of a magnetic force, said developer comprising a toner and a carrier, and a regulating member opposing the developer carrier member across a required distance therebetween and regulating the amount of developer transported by the developer carrier member to the development region, said regulating member being formed of a magnetic material, wherein an increased frictional force is produced between a surface of said regulating member opposing said developer carrier member and the developer.

7. A development device of claim 6, wherein said regulating member has a thickness of not smaller than 0.5 mm at an end portion of said regulating member having said surface.

8. A development device of claim 6, wherein said carrier has an average particle size ranging from 20 to 70 $\mu$m.

9. A development device comprising:

a developer carrier for transporting a developer to a development region opposite to an image bearing body as binding the developer thereto by means of a magnetic force, and a regulating member opposing the developer carrier across a required distance therebetween and regulating the amount of developer transported by the developer carrier to the development region, wherein said developer carrier has a surface roughness Rs of not greater than 30 $\mu$m and a relationship between the surface roughness Rs of the developer carrier and a surface roughness Rb of a developer-carrier-opposed surface of said regulating member satisfies $1.1 \leq Rb/Rs \leq 5.0$.

10. A development device of claim 9, wherein said regulating member is formed of a magnetic material.

11. A development device of claim 9, wherein said regulating member has a thickness of not smaller than 0.5 mm at its developer-carrier-opposed surface.

12. A development device of claim 9, wherein said developer comprises a toner and a carrier.

13. A development device of claim 12, wherein said carrier has an average particle size ranging from 20 to 70 $\mu$m.

* * * * *